INVENTOR.
ARTHUR MAGSON

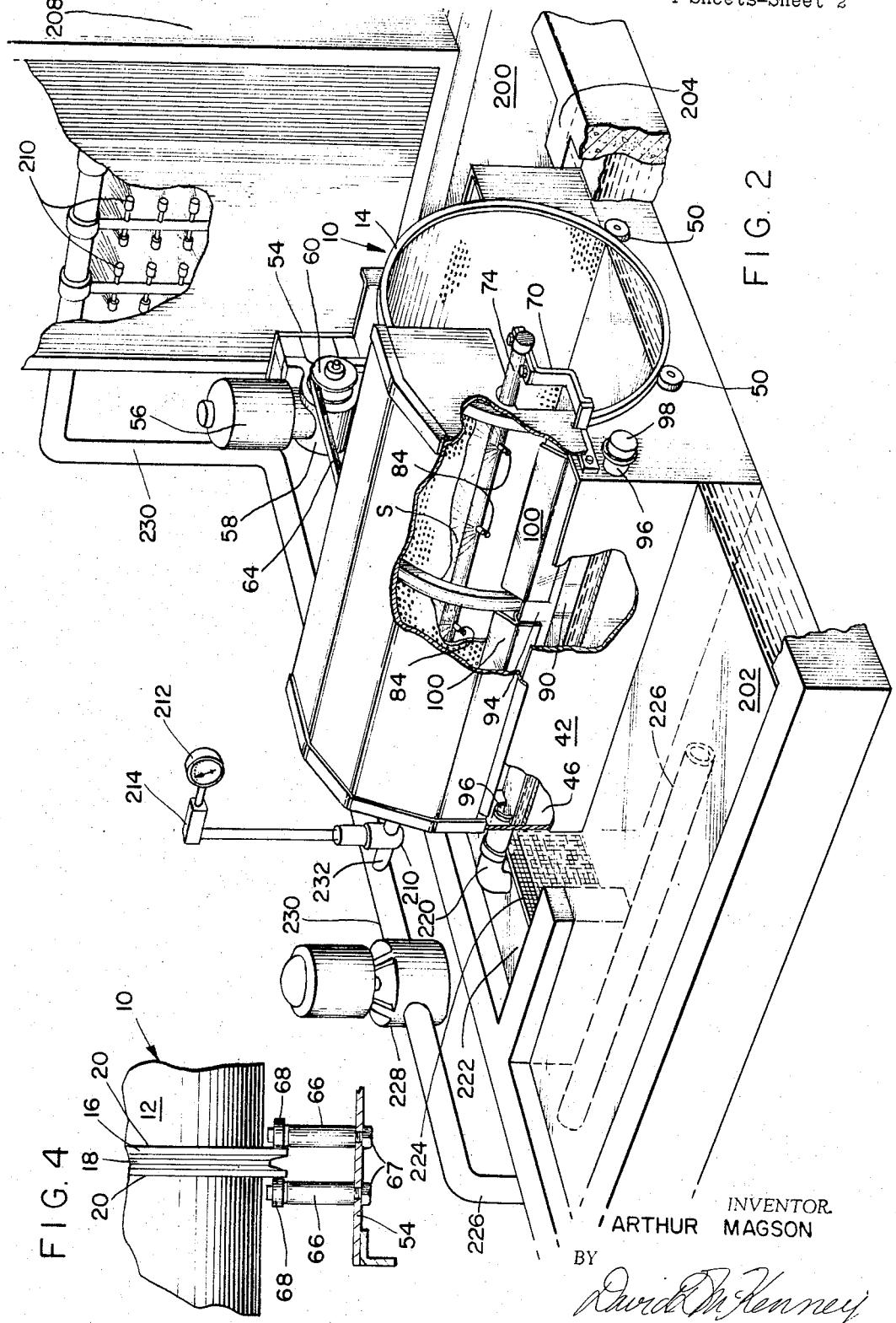

Oct. 31, 1967     A. MAGSON     3,349,916
SELF-CLEANING ROTARY STRAINER
Filed Oct. 7, 1964     4 Sheets-Sheet 3
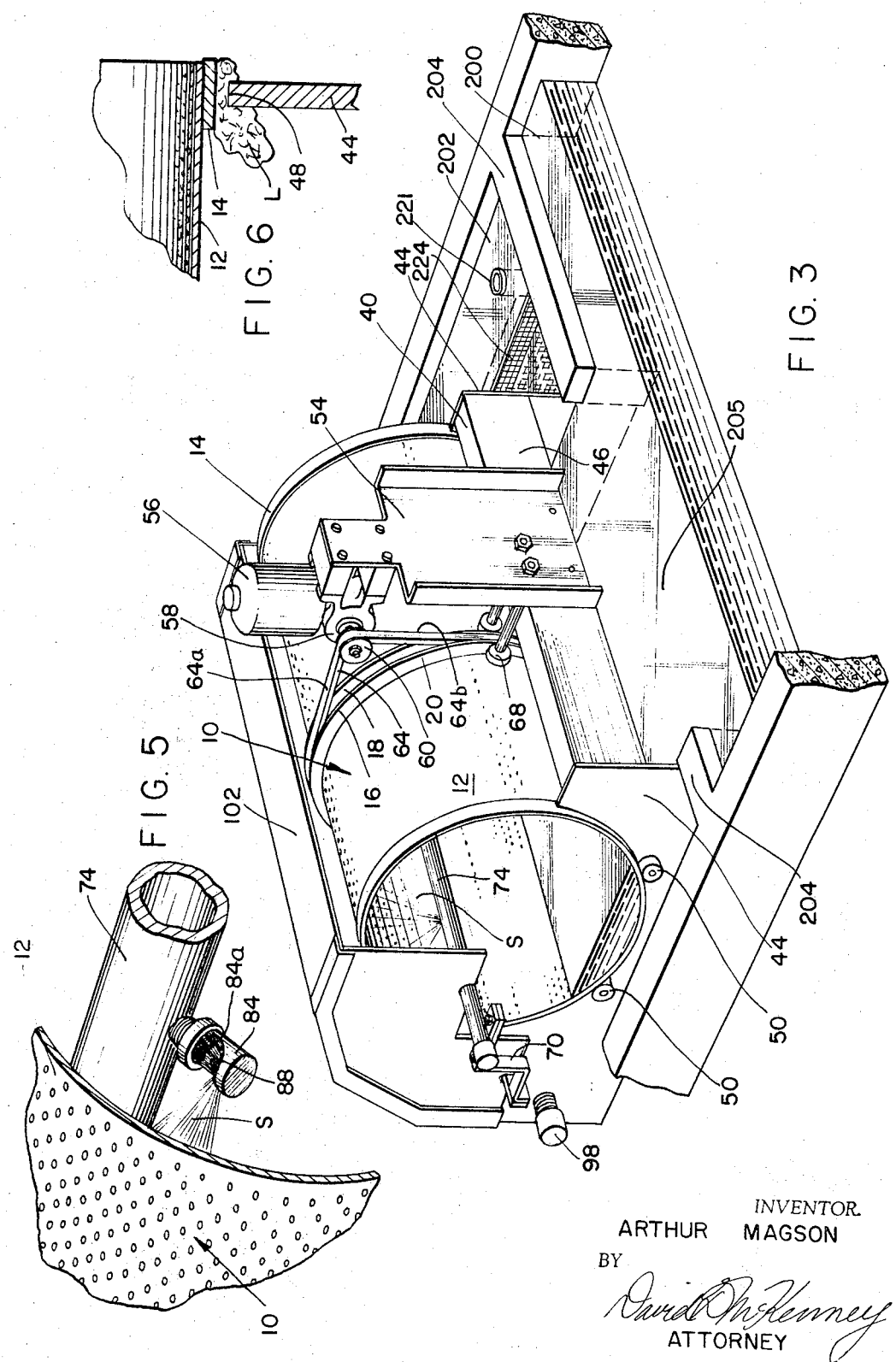
INVENTOR.
ARTHUR MAGSON
BY
David M. Kenney
ATTORNEY

United States Patent Office 3,349,916
Patented Oct. 31, 1967

3,349,916
SELF-CLEANING ROTARY STRAINER
Arthur Magson, Cumberland, R.I., assignor to Grinnell Corporation, Providence, R.I., a corporation of Delaware
Filed Oct. 7, 1964, Ser. No. 402,147
8 Claims. (Cl. 210—143)

This invention relates generally to improvements in apparatus for removing lint and other suspended solids from water. More particularly the invention relates to improvements in rotating cleaners which run partially submerged in the liquid to be filtered, and which incorporate self-cleaning features.

In the past rotary cleaners of the instant type have been made with heavy axles about which a generally cylindrical strainer was rotated. The straining cylinder was usually attached to this axle by hubs or spokes. The result was a relatively heavy structure having considerable inertia and requiring powerful positive drives such as gearing and or chains and sprockets. All of these elements, axles, hubs, spokes, chain drives and gearing, accumulated lint and required frequent cleaning. Furthermore, the positive drive mechanisms employed often jammed causing considerable damage to the equipment. Still further, the hubs and spokes made flush cleaning of the strainer screen, particularly from the inside out, a difficult procedure requiring a complex system. Moreover, all of these factors made periodic cleaning of the sump in which the strainer is located difficult since the heavy strainer and drive mechanism must be removed from their bearing and then realigned upon reassembly.

One embodiment of the instant invention, which is preferred since it overcomes all of the above difficulties, includes a cylindrical strainer having tire rings at either end. The strainer rotates on these rings which are received in arcuate openings in the supporting frame. The walls of the frame act as weirs while the openings act as spillways. Liquid to be filtered passes into the frame through an opening in the rear. To pass over the spillways it must first pass through the strainer which is received in the spillways. The strainer is rotated by a belt which is driven from a relatively small pulley located adjacent the strainer and above the top of the spillway. Due to its size and location and due to the fact that the strainer cylinder is not vertically restrained any jam which might occur will lift the strainer and thus slacken the belt and cause it to slip at the pulley thus stopping the strainer and preventing damage. Furthermore, since the strainer is open at both ends and unobstructed by hubs etc. it is a simple matter to insert a spray manifold to flush the strainer periodically as desired. Still further, disassembly and maintenance are considerably facilitated since with the spray manifold removed and the belt disengaged from the drive pulley the strainer may be easily lifted, due to its light weight, from the frame to allow cleaning of the sump in which it is installed.

Having thus described generally a preferred embodiment of the invention a principal object thereof is the provision of a rotary strainer which will stop itself immediately upon jamming thus preventing damage to the fragile strainer element.

Another object of the present invention is the provision of a rotary strainer wherein the strainer element is light in weight, having no hubs, spokes, or axles.

Another object of the present invention is the provision of a rotary strainer wherein the straining element is vertically unrestrained.

Another object of the present invention is the provision of a rotary strainer, which, when jammed, automatically releases its drive mechanisms.

Another object of the present invention is the provision of a belt drive rotary strainer which, when jammed, will shorten the distance between the strainer element and the driving pulley thus causing the drive belt to slacken and slip.

Another object of the present invention is the provision of a rotary strainer which runs partially submerged in the liquid to be strained and discharges the strained liquid from its interior, out through its ends.

Another object of the present invention is the provision of a rotary strainer which may be easily disassembled for cleaning.

Another object of the present invention is the provision of a rotary strainer which is self-cleaning.

Another object is the provision of a self-cleaning rotary strainer having a spray manifold which directs spray from the inside of the strainer element to flush away material adhering to the outside of the strainer.

In the drawings, in which the same reference numerals are used throughout the several views to indicate like parts:

FIG. 2 is a perspective view from the front of the instant invention illustrating a particular mode of installation with portions cut away to show some internal elements.

FIG. 3 is a perspective view from the rear of the instant invention illustrating the same installation as FIG. 1 with portions cut away to show some internal elements.

FIG. 4 is a fragmentary view showing a portion of the alignment mechanism of the device of FIG. 1.

FIG. 5 is a fragmentary view showing a portion of the flushing mechanism of the device of FIG. 1.

FIG. 6 is a fragmentary view showing the self-gasketing action of the device of FIG. 1.

Figure 1:
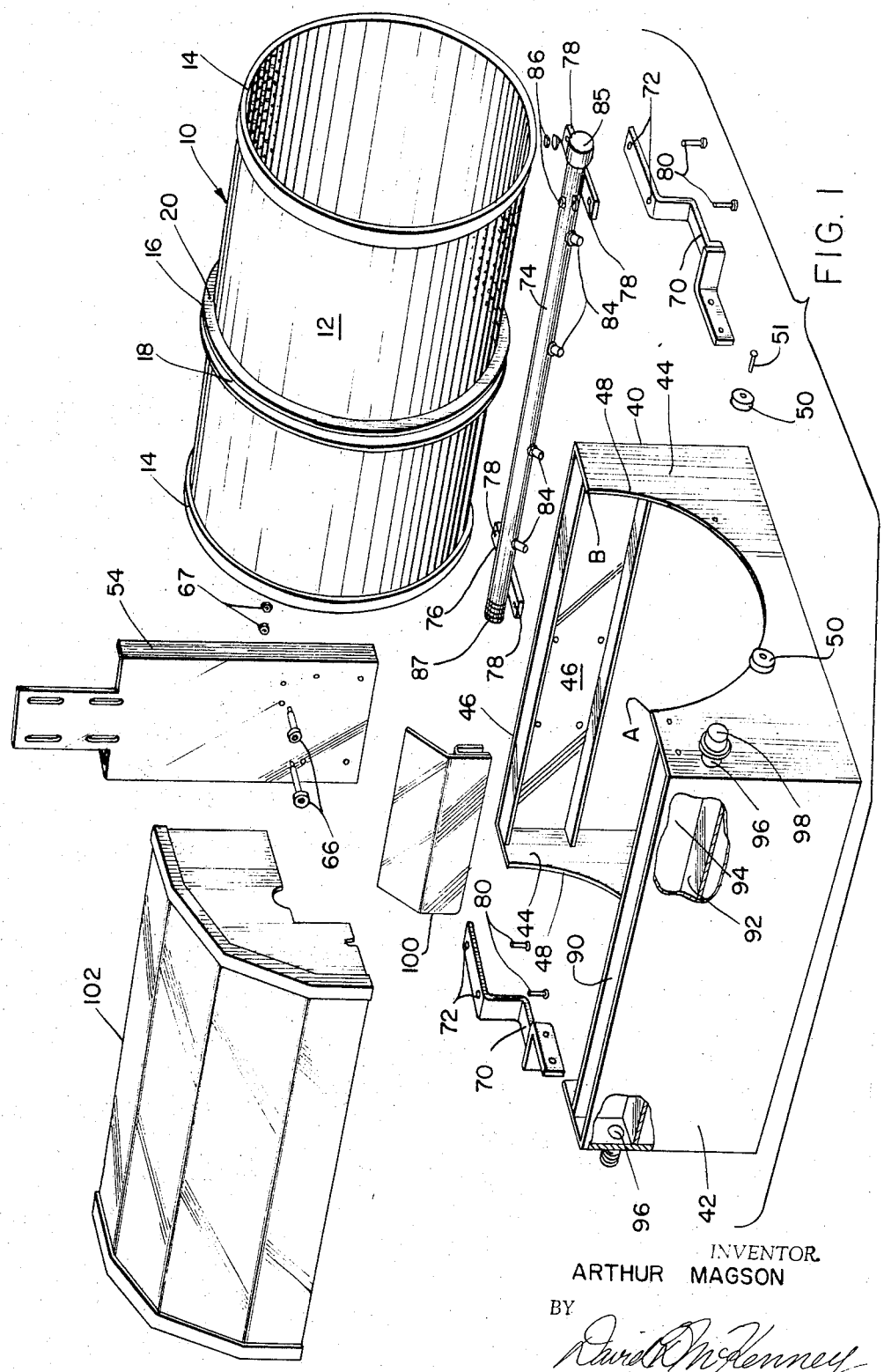
FIG. 1 is an exploded view of the present invention with portions cut away to show some internal elements.

Referring now more particularly to the drawings, FIGS. 1, 2, and 3 illustrate the machine incorporating the present invention comprising a foraminous strainer 10 which is cylindrical and open at its ends. The strainer is made of any suitable corrosion resistant material such as stainless steel and comprises a shell 12 of foraminous sheet material and several rings 14 and 16 which, among other functions, lend the necessary degree of rigidity to the structure. Rings 14 at either end of the cylinder also act as tires upon which the strainer may rotate. Ring 16, located at the longitudinal center of the cylinder acts as a drive ring. It has a V-groove 18 to accommodate a drive belt and radially extending sides 20 which serve as guides to maintain longitudinal alignment of the strainer.

Rectangular frame 40 provides the base for the strainer. It has two end walls 44 and a front wall 42. The free ends of walls 44 are connected with brace 46 which extends only across the upper portion of the frame. The end walls 44 have axially aligned arcuate openings 48. These arcuate openings extend no more than 90° from either side of the lowest point on the arc and terminate at points A and B. The end walls are spaced so that these openings receive the tire rings and are only slightly larger than the tires to provide the clearance for rotation. To reduce friction between the arcuated opening and the cylinder supported therein a pair of rollers 50 may be rotatably mounted by pins 51 on each end wall. Portions of the rims of these rollers will extend slightly beyond the edge of the arcuate openings and provide a rolling surface for the tires to run on. It will be understood that while rollers may be used to facilitate rotation of the strainer any other friction reducting means such as a Teflon moulding on the edge of the arcuate opening would be suitable for this purpose.

The drive train for the strainer cylinder comprises any conventional motor 56 and reduction gearing 58 having a V-groove pulley 60 providing its output. These are mounted on bracket 54 which is in turn mounted on the rear brace and positioned to provide radial alignment between pulley 60 and drive ring 16. Belt 64 is driven by the pulley and in turn rotates the strainer. It will be noted that the drive pulley is quite small in relation to the strainer and is located quite close to the strainer. It is further vertically located so that the upper run of the belt 64a is substantially horizontal and the lower run 64b is substantially vertical as it leaves the pulley. This position is significant in that it is one of a family of positions which provides the fail-safe features sought. It will be dealt with in more detail hereinafter.

A pair of rollers 68, FIG. 4, are mounted by pins 66 and nuts 67 to the rear brace. They are positioned so that the rollers will engage the radial sides 20 of the drive ring 16 so that, as stated, the longitudinal alignment of the strainer cylinder in the frame will be assured.

Arms 70 are attached near the upper edge of each of the side walls between the front of the frame and the arcuate openings. These extend generally outwardly from the end wall, and rearwardly and upwardly over the arcuate openings. The free ends of each arm are provided with mounting holes 72. A manifold 74 spans these arms, passing through the strainer and out its open ends. The manifold is provided with plates 76 having holes 78, which register with holes 72 on the arms. Bolts 80 which pass through the registered holes and nuts 82 detachably mount the manifold on the arms.

The manifold is provided with nozzles 84 which are constructed and positioned to eject a sheet of spray S which will impinge upon the inside of the strainer at a point forward of its axis and above the frame. Such a nozzle is shown in FIG. 5. This nozzle is provided with a deflector 88 in front of its orifice 84a whereby the stream flowing from the nozzle is turned through a 90° angle and spread out thus providing a broad sheet of spray S leaving the nozzle in a path tangent to the face of the deflector. The manifold is closed at one end as with cap 85 and provided with threads 87 at the other whereby it may be connected to a water supply (see FIG. 2).

Trough 90 which is adjacent the upper edge of the frame between the strainer and the front wall is provided to catch spray from the nozzles after it passes through the perforations of the strainer. The trough comprises the upper portion of front wall 42, a bottom 92 extending rearwardly from the front walls and a rear wall 94 extending upwardly from the bottom. The rear wall is adjacent to the strainer but not in contact therewith. Blades 100 (FIGS. 1 and 2) are removably attached to the upper edge of rear wall 94. These blades extend longitudinally on either side of ring 16 to the inside edge of rings 14 and extend upwardly and rearwardly to a point closely adjacent the strainer but below the point of impingement of the spray from the nozzles. The purpose of the blades is to facilitate the collection of the spray by the trough. The trough is further provided with drain conduits 96 at either end. One of these conduits may be closed as by cap 98 and the other may be coupled to a drain system 220 (FIG. 2).

A removable hood 102 covering the top of the trough and the upper forward quadrant of the strainer is provided to deflect the spray from the nozzles down into the trough.

In a typical installation as shown in FIGS. 2 and 3 the strainer embodying the present invention is used in conjunction with an air washer 208. Air is passed from the air conditioning system of a textile mill through the air washer where nozzles 210 produce a spray which traps particles of lint and other solids and removes them from the air. This spray water with its entrapped lint drains into catch basin 200. The catch basin and a sump 202 are separated by a wall 204, having an opening 205 communicating with the catch basin and the sump. The strainer is installed in the sump with the rear edges of the end walls of the frame abutting wall 204 on either side of the opening 205. The frame then forms a U-shaped compartment through which water passing from the catch basin to the sump must flow. The walls of the frame thus act as weirs. The water level in the catch basin and the sump is such that it is above the bottom of the arcuate openings which act as spillways and thus above the bottom facing portion of the strainer which is received in the openings. To reach the sump water must therefore flow through the strainer and out through its open ends. In flowing through the strainer the water deposits its suspended solids such as lint on the outside of the strainer. Since the strainer is being turned by the motor, a fresh straining surface is constantly being presented to the water thus allowing a high flow rate through a relatively unclogged strainer. To remove the deposited solids from the strainer it is flushed by passing clean water through the strainer in the reverse direction utilizing nozzles 84 for this purpose. It will be noted that a relatively small amount of water is required for this purpose. The water and flushed solids are then collected in trough 90 and flow through the drain conduit 96 and drain pipe 220 into a portion of the sump 222 which is screened off by screen 224. Here the solids are allowed to settle and are periodically removed by shovel or other suitable means. A maximum water level is regulated by the height of drain pipe 221. In the particular installation described the filtered water in the sump is returned via pipe 226 and motor driven pump 228 and through return line 230 to the air washer for reuse. Since the strainer can operate for an appreciable period of time without clogging it is only necessary to flush it periodically. Water for this purpose is drawn from the return line by pipe 232 which is coupled to the manifold. It is controlled by any conventionally activiated valve such as 210 which is controlled by timer 212 and relay 214.

Although a felt or other gasket may be used between the tire ring of the strainer and the arcuate opening of the frame in which the tire ring runs, it has been found that, due to the overlying relationship of the tire ring and the arcuate opening as well as the small clearance between them, a straining effect takes place at this point (FIG. 6). This results in a lint buildup L which creates an effective gasket and which prevents further passage of lint into the sump. Since this is a continuing process, any lint removed by adherence to the tire ring is quickly and automatically replaced, thus maintaining the efficiency of the strainer and eliminating the need for a felt gasket which requires a constant maintenance. It is appropriate to note that due to the extreme simplicity of this strainer, there being no seals, glands or gaskets but merely a clean, open end, light weight cylinder, there is relatively little mechanism which might become clogged with lint causing a jam. It will also be noted that due to the positioning of the drive pulley and the resulting configuration of the belt, the driving surface of the belt is in complete contact with the drive ring at all points where it is submerged, thus eliminating the collection of lint on either the belt or the drive ring due to being pinched or caught therebetween.

By utilizing a light weight strainer several surprising results are obtained which are not normally associated with the reduction of weight in a machine. Primarily they are increased durability in operation and greatly facilitated maintenance. Due to the light weight of the strainer no supporting hubs or spokes are required to maintain its shape. This eliminates many points upon which lint may accumulate and cause trouble. Furthermore, it allows the use of a very simple belt drive system replacing the conventional chain and gear drives. Due to the light weight and lack of heavy shafts and bearings normally associated with rotating strainers which run partially submerged the instant strainer is very easily removed by one man for servicing and for cleaning out sediment which collects in the frame below the strainer.

The primary sources of damage to the strainer will occur if a large piece of material should jam between the bottom of the sump and the strainer or if an unusually large accumulation of lint or other material should jam between the tire ring and the spillway. The damage would be badly compounded if after the strainer became jammed and the motor continued to turn or attempt to turn it. Since the light weight cylinder which is so advantageous is fragile and highly susceptible to damage from jamming it is important that it should stop as fast as possible upon the occurrence of a jam to prevent damage by twisting or abrasion. In this regard, note FIGS. 7 and 8, which are diagrammatic and exaggerated for clarity.

It will be seen that should a jam J or J' occurring either under the strainer or between the tire ring and the arcuate opening the cylinder will immediately lift the strainer and pivot it about point A or B depending on the position of the jam.

Point A will be used to indicate the terminus of the arcuate spillway which is furthest from the pulley, while point B will indicate the terminus of the arcuate spillway which is nearest to the pulley. As a practical consideration neither point A nor B can be below the water line since leakage would then occur between the strainer and spillway thus passing unstrained water into the sump. Neither point A or B can be more than 90° from the bottom of the arcuate opening since a reentrant configuration would result which will make pivoting of the strainer about that point difficult and a cause of high stress.

Figure 7:
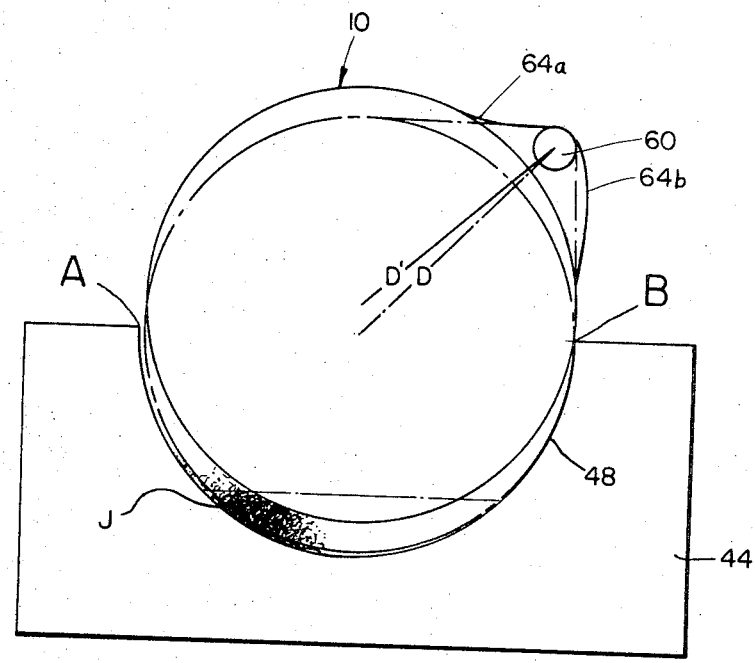
FIGS. 7 and 8 are diagrammatic views of the fail-safe feature of the instant invention.
Figure 8:
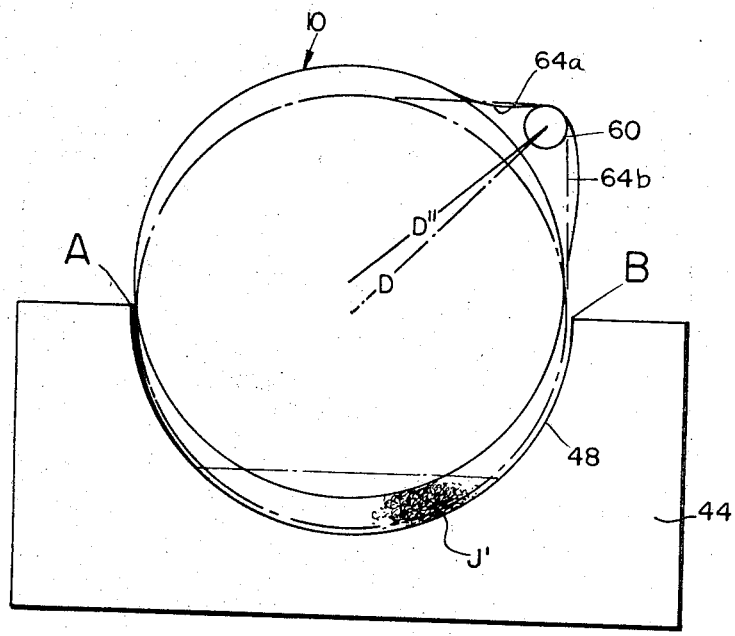

When point B acts as a pivot as in FIG. 7, it is obvious that as long as it is located at no more than 90° from the bottom of the arcuate opening the centerline distance D will be shortened to D' in which case the belt will slacken and since the belt is in contact with only a relatively small portion of the drive pulley it will slip. This will allow the strainer to stop turning thus preventing damage. When point A acts as the pivot point (FIG. 8), it will be noted that as long as point A and the drive pulley are less than 180° apart the centerline distance D will be shortened to D". As a practical matter, it has been found that if A is close to 180° from the drive pulley an overcenter action occurs as soon as the strainer is lifted more than a slight amount. For this reason it has been found that an angle of 150° or less between point A and the pulley gives the most satisfactory results since a considerable amount of strainer lift can be tolerated without producing an overcenter action. From this it can be seen that a fail-safe rotating strainer of the partially submerged type can be constructed if the arcuate strainer is supported for rotation in an arcuate opening which is substantially 180° or less but large enough for its upper ends to extend above the water line of the system in which it is used. Futhermore, the driving pulley must be located above the highest point on the arcuate opening and as a practical matter should be located less than 150° from the farthest high point on the arcuate opening. Still further the pulley should be located as close to the strainer as possible, allowing for movement of the strainer during a jam and for removal of the strainer for maintanence without movement of the pulley. This pulley positioning will insure a minimum of contact between the drive belt and the pulley which will result in a highly sensitive belt-pulley relationship allowing the belt to slip at the earliest possible moment after a jam occurs. An added advantage which accrues from the fact that the strainer is free to rise vertically is that there is a floating action caused by water which is displaced due to resistance to flow through the strainer. This results in a further lightening of the strainer with respect to an object jammed underneath it, thus further minimizing the risk of damage to the strainer.

What I claim and desire to secure by Letters Patent is:
1. In a rotating strainer the combination comprising:
 (A) a foraminous element which:
  (I) has a first axis of rotation through itself
  (II) has an exterior surface concentric with said first axis
  (III) has bearing surfaces which:
   (a) are on said exterior surface,
   (b) are longitudinally spaced with respect to each other,
   (c) are concentric with said first axis,
  (IV) has a driving surface which:
   (a) is on said exterior surface,
   (b) is concentric with said first axis,
 (B) support means:
  (I) which operatively engage said bearing surfaces to permit rotation and vertical movement,
  (II) at least one of which comprises:
   (a) a weir,
   (b) a spillway which:
    (i) is in the top of said weir,
    (ii) has an arcuate portion which: (a) comprises the bottom of said spillway, (b) is concentric with the bottom facing portion of said bearing surface, (c) is in substantially sealing relationship with the bottom facing portion of said bearing surface, (d) has a termini which: (1) are on either of said arcuate portion, (2) are no more than 180° apart when measured by the angle including said arcurate portion,
 (C) drive means comprising:
  (I) a power source,
  (II) a pulley which:
   (a) is operatively associated with said power source,
   (b) is substantially smaller than said driving surface,
   (c) is adjacent said driving surface,
   (d) has a second axis of rotation which:
    (i) is parallel to said first axis,
    (ii) is above said termini,
    (iii) is no more than approximately 150° from the termini most distant from said second axis,
  (III) a belt which:
   (a) operatively engages said drive pulley,
   (b) operatively engages said driving surface, whereby an obstruction lodging between said bearing surface and said spillway will cause said foraminous element to rise up and pivot thereby shortening the distance between the first axis of rotation and the second axis of rotation which in turn will permit the belt to slip at the drive pulley thus stopping further rotation of the foraminous element.

2. The combination of claim 1 wherein said exterior surface comprises a cylinder concentric with said first axis and wherein said bearing surfaces comprise a pair of tire rings mounted on said exterior surface at either end of said cylinder.

3. The combination of claim 2 wherein said support means comprise a weir and spillway operatively associated with each of said tire rings.

4. The combination of claim 3 further comprising at least one flange extending radially from said exterior surface, means, fixed with respect to said weirs, adjacent said flange to engage said flange to prevent longitudinal displacement of said cylinder.

5. The combination of claim 4 wherein said driving surface is located substantially at the center of said foraminous element and wherein one of said flanges is located adjacent either side of said drive surface.

6. The combination of claim 5 further comprising a ring, concentric with said first axis, substantially centrally located on said exterior surface, having radial sides comprising said flanges and a circumferential surface between said sides defining a V-groove therein which comprises said driving surface.

7. The combination of claim 3 wherein said foraminous element comprises a cylinder having a cylindrical interior surface, said interior surface defining an open and unobstructed interior and open and unobstructed ends, a thin cylindrical foraminous wall separating said exterior surface and said interior surface.

8. The combination of claim 7 further comprising means for flushing said cylinder, said means comprising a manifold, extending through at least one of said open ends, adjacent said interior surface, nozzles on said manifold adapted to direct a spray of liquid against said interior surface, coupling means on said manifold for connecting said manifold to a liquid supply.

References Cited

UNITED STATES PATENTS

| | | | |
|---|---|---|---|
| 1,279,949 | 9/1918 | Waterman | 210—403 |
| 1,451,522 | 4/1923 | Baxter | 210—403 X |
| 1,726,608 | 9/1929 | Brackett | 210—161 |
| 2,426,886 | 9/1947 | Komline | 210—391 X |
| 3,000,507 | 9/1961 | Young | 210—402 |

REUBEN FRIEDMAN, *Primary Examiner.*

SAMIH N. ZAHARNA, *Examiner.*

J. ADEE, *Assistant Examiner.*